United States Patent Office 3,203,862
Patented Aug. 31, 1965

3,203,862
ORAL ANTI-HYPERCHOLESTEROL
COMPOSITION
John Harris Jones, 3701-B W. Van Buren, Bellwood, Ill.
No Drawing. Filed Mar. 11, 1960, Ser. No. 14,181
8 Claims. (Cl. 167—65)

This invention relates to an edible, therapeutically useful composition having a high vegetable oil content, especially compounded to induce improved stability in blood emulsion by increasing the stability in the fat phase, and thereby lowering cholesterol levels and lessening a cause of thrombosis.

One of the most difficult problems met with in human circulatory deseases is that of hypercholesterolemia, principally because it is progressive and often causes thrombosis. Circulatory accidents caused by clots are generally treated by anticoagulant therapy.

The danger of anticoagulant therapy is attested to in part by Drs. Kevin D. Barron, M.D. and Guillermo Fergusson, M.D., who report, in the Journal of the American Academy of Neurology, July 1959, vol. 9, No. 7, pages 447, 455, on several cases of accidental massive intracranial hemorrhage due specifically to the introduction into the system of dicumarol and heparin to reduce the liability of clots to form in the blood stream.

Recent investigation has shown that saturated fats are contributing factors in aggravating hypercholesterolemia. Still more recent investigation has shown that unsaturated fats have been used with some degree of success in the treatment of the condition that is credited with causing the high level of cholesterol in the blood. It is claimed that unsaturated fats added to the diet lower the cholesterol level. It would be expected from the foregoing that adding unsaturated fats to the diet to reduce the level of saturated fats in the blood would be the answer to the problem of preventing thrombosis, but this has not been clearly demonstrated. Kritchevski in his report on "The Effect of Dietary Components on Cholesterol Metabolism" in the Journal of The American Oil Chemists Society for March 1959, vol. 36, #3, states:

"The severity of atherosclerosis could not be correlated with serum cholesterol levels."

Much work has been done in the medical field on the addition of phosphatides to the human diet but the results left much to be desired, principally because there was no means to prevent the wetting of the phosphatides which are not soluble in edible fats or oils if they are wet, and the form in which they are commercially available creates a resistance to their acceptance. Massive doses are prescribed which cause nausea and upset.

The commercial phosphatides are the acetone insoluble fraction of soya oil and when taken in fruit juice or other aqueous vehicle they become wet.

Phosphatides react with water to form hydrates which are insoluble in fats or oils and form complexes with sugars, proteins, etc.

It is the water barrier first met with in the mouth and later in the process of ingestion that defeats the well intentioned effort to pass the phosphatides into the fat phase of the blood.

My composition is a dry or anhydrous formulation of phosphatides dissolved in a dry vehicle of unsaturated edible fat, the fat vehicle acting to more efficiently transport the dry phosphatides through the water barrier of the body processes.

Therefore I have provided a new composition of matter for the treatment of hypercholesterolemia from a different angle than that of lowering the cholesterol level only. The object of the invention is to provide an edible composition useful for lowering blood fat surface tension and thus insure a finer dispersion of blood fat in the aqueous phase of the blood, thus further insuring a more stable blood emulsion, with a much lowered tendency for the solids not fat to clump or clot, and a much lowered tendency for the high melting point fractions of the fat phase to grain out, or freeze out.

Other objects and advantages of the invention will appear in the following description thereof.

The composition of the present invention is as follows:

96% or less by weight corn oil or any edible unsaturated vegetable oil
4% or more by weight soya lecithin or other vegetable or animal phosphatides, percentage not critical
16,000 units (per lb.) vitamin A
3,200 units (per lb.) vitamin D
Butter flavor, q.s.

The preferred method of compounding these ingredients is as follows:

In a jacketed stainless steel vacuum kettle with agitator, place the 96 parts or less of commercial, refined, edible unsaturated vegetable oil and heat to 120° F. Then add the 4 parts or more of vegetable phosphatides. The phosphatides are not completely soluble in the oil vehicle at this point and will precipitate. Then start the agitator (230 r.p.m.), close kettle and apply 28 inches or more vacuum, apply low heat to jacket, bring batch to 120° F., at which temperature the batch will foam heavily. Provision is made to handle the foaming.

The temperature of the batch will gradually rise from 120° F. but the temperature should not be permitted to go over 140° F. The temperature could be permitted to go higher to 180° F. but the 140° F. temperature is preferable to insure prevention of damage to the phosphatides such as caramelizing. After processing the batch for approximately 4 hours and the foaming has subsided, any moisture in the batch will have been entirely eliminated, and then the batch is cooled to below 90° F. The phosphatides at this stage are completely soluble in the oil vehicle because they are dry and will not precipitate. When the batch has been cooled to 90° F., the vacuum is broken by introducing nitrogen into the head space of the kettle. At this point the vitamins and flavor are added.

The finished batch should be stored in a closed kettle under nitrogen to maintain stability, principally of the vitamins.

While the corn oil of the composition has a therapeutic place in the formula, it is used principally as a protective vehicle for the dissolved dry lecithin or phosphatides therein to insure their transportation through the water barriers in the body process into the blood fats.

High melting point fat fractions are described as saturated, and the degree of saturation of an oil or fat is indicated by its iodine number (I#). Corn oil, or other unsaturated fat, when ingested, tends to produce lower melting points and higher iodine numbers in blood fat but as previously stated this has no correlation with the hypercholesterolemia. It has been demonstrated that adding unsaturated fats to the diet does raise the iodine number of blood fat with a resultant lowering of the cholesterol level. It has also been demonstrated that adding phosphatides to the diet raises the iodine number of the blood fat. My composition, being a combination of both unsaturated fats and phosphatides, provides an ideal formula to produce high iodine numbers and low melting points or low titres in human blood fat.

The surface active ingredient in the composition is a vegetable oil phosphatide (lecithin), which is the original natural phosphatide extracted from virgin soya bean or other edible vegetable oil by hydration, centrifuging, or other process, and then drying under a vacuum to a moisture content of 1% or lower. In this form it is readily dispersed but is not soluble in vegetable or animal oils or fats, but will precipitate in unsaturated oil.

In my invention I further dry both the oil vehicle and the incorporated phosphatides at low protective temperatures and high vacuum, to a point where the phosphatides are soluble in the oil vehicle and will not precipitate. Phosphatides or lecithins that are wet are not soluble in oil or fat. My formula and process insures that the phosphatides are protected against wetting in the process of oral intake and ingestion, and therefore are more efficiently transported into the fat phase of the body blood fat in which the dry phosphatides would be soluble.

The reason for incorporating the vitamins A and D in the formula is to permit the physician to prescribe its use at mealtime instead of oleomargarine or other spreads.

There is thus compounded a formula useful in reducing the tendency of blood to develop a thrombus by inhibiting hypercholesterolemia and that can be safely prescribed by the physician without fear of a hemorrhagic accident as the result of either overdosage or continuing dosage.

To briefly summarize, it may be stated that one of the simplest forms of emulsion is described as an oil in water emulsion. This is a composition in which the oil or fat is finely dispersed in an aqueous phase.

Instability in oil in water emulsions shows up as a break in the emulsion. This is a condition where the oil or fat phase agglomerates or coalesces into progressively larger globules, the emulsion ultimately separating.

Blood emulsion differs from an oil in water emulsion in that there are solids in the aqueous phase such as blood cells, etc. Instability in blood emulsion shows up as an increase in the size of the fat globules caused by the agglomeration or coalescence of the fat phase and associated with this agglomeration or coalescence of the fat phase is the agglomeration or coalescence of the solids, not fat.

This agglomeration or coalescence of the solids, not fat, may show up as a clump or clot. This clump of solids is an unbalanced disorganized mass and not a true clot which is a natural organized blood phenomenon.

One of the causes of instability in the oil or fat phase of an emulsion is the graining out or crystallization of the higher melting point fat fractions from their host, the fat or oil phase of the emulsion.

A single fat crystal will act to stimulate the growth of like crystals in its immediate vicinity. This is known as seeding and could be the explanation for the formation of the plaques of high melting point fat fractions found on the intima of blood vessels.

The tendency for edible oils or fats to grain out can be reduced by incorporating in the oils or fats a small fraction of an edible compatible surface active factor. This will also act to reduce the surface tension of the fat.

If a low surface tension oil or fat is used in making an emulsion, a finer dispersion of the oil or fat in the aqueous phase will result, and the finer the dispersion the more stable will be the emulsion.

Lowering the surface tension of the oil or fat used in making an emulsion will produce an emulsion that is lower in viscosity, and if the surface active factor used to lower surface tension is a phosphatide, then in addition to a lowered viscosity there will be an increase in lubricity.

High melting point fat fractions are described as saturated. There is a laboratory test that indicates the degree of saturation of an oil or fat, which is called the iodine number (I#).

Dr. Best, Department of Physiology, University of Toronto, demonstrated that it was possible to produce in the fat of normal rats iodine numbers ranging all the way from an I# of 92 to an I# of 130. What is significant about this experiment is that it shows that it is possible to produce in animal fat heavily saturated fats equivalent to non-winterized cotton oil in physical character, also, fats with a high iodine number that were equivalent to salad oil in physical character. Dr. Best obtained these extremes in iodine number and physical character by introducing into the diet of rats what he called lecithin (phosphatides). He was only interested in the transport of fat from the liver of the animals, and in this he was successful.

My invention makes available a dietary adjunct which when ingested by humans will be expected to produce the following in blood emulsion:

(1) A rise in the I# (iodine number) of blood fat.
(2) A lowering of blood fat melting point.
(3) A lowering of blood fat titre.
(4) A lowering of blood fat surface tension.
(5) A finer dispersion of blood fat in the aqueous phase.
(6) A more stable blood emulsion.
(7) A lower blood emulsion viscosity.
(8) An increase of blood emulsion lubricity.
(9) A drop in blood pressure.
(10) A drop in pulse rate.
(11) If low blood fat surface tension can be maintained, it could be expected that the high melting point fat fractions (cholesterol) deposited on the blood vessels would ultimately be removed or laved off.
(12) Lowering blood fat surface tension by increasing the phospholipid level lowers the point at which the higher melting point fat fractions grain out, making for a more stable fat phase.

While I have described what I consider to be a preferred method of manufacturing the product of my invention, I recognize that variations in temperature, vacuum and agitation may be resorted to without departing from the spirit of the invention.

I claim:

1. An anhydrous pharmaceutical composition for oral administration comprising about 9 parts of anhydrous unsaturated, edible vegetable oil and about 1 part of anhydrous phosphatides dissolved in the composition and in which the phosphatides cannot be removed by filtration.

2. A pharmaceutical composition for oral administration comprising a solution of completely anhydrous edible vegetable oil and completely anhydrous phosphatides dissolved in the oil, wherein the phosphatides comprise up to 10% by weight of the composition.

3. A pharmaceutical composition for oral administration consisting of a solution of completely anhydrous edible vegetable oil and completely anhydrous phosphatides wherein the phosphatides are dissolved in the oil and the volumetric ratio of oil to phosphatides is of the order of nine to one.

4. An anhydrous pharmaceutical composition according to claim 3, wherein the phosphatides cannot be removed by centrifuging.

5. A method of dissolving about one part of an anhydrous phosphatide in about 9 parts of a dry edible vegetable oil vehicle, comprising processing the oil to remove all latent molecularly entrapped moisture therefrom, mixing the phosphatide and oil in a vacuum kettle under a suitable vacuum, rapidly agitating the mixture while under vacuum, simultaneously heating the mixture to a temperature of not more than 120° F., continuing the agitation and maintaining said temperature and vacuum until the product is completely anhydrous and the phosphatide is completely dissolved in the oil vehicle.

6. A method of preparing a completely anhydrous pharmaceutical composition for oral administration, consisting of removing all latent entrapped moisture from a quantity of unsaturated edible vegetable oil, mixing therewith a small quantity of phosphatides comprising about 10% of said composition, and rapidly stirring said vegetable oil and phosphatides under vacuum and heat until all latent entrapped moisture is removed therefrom resulting in a completely anhydrous composition in which the phosphatides are completely and permanently dissolved in the vegetable oil.

7. The method according to claim 6, wherein the stirring is at about 230 r.p.m., the vacuum at about 29 inches and the heat at about 120° F.

8. The method of treating hypercholesterolemia in humans which consists of administering orally at regular intervals in doses which may be conveniently swallowed a solution of about 9 parts of completely anhydrous edible vegetable oil and 1 part of completely anhydrous edible phosphatides dissolved in the oil.

References Cited by the Examiner

UNITED STATES PATENTS

| | | | |
|---|---|---|---|
| 2,245,537 | 6/41 | Thurman | 167—65.5 |
| 2,269,772 | 1/42 | Kruse | 167—65.5 |
| 2,555,137 | 5/51 | Karjala | 99—15 |
| 2,555,972 | 6/51 | Karjala | 99—118 |
| 2,935,448 | 5/60 | Calder | 167—65.5 |

FOREIGN PATENTS 555,637  4/58  Canada.
721,514  1/55  Great Britain.

OTHER REFERENCES

Armstrong: PSEBM, vol. 92, No. 2, p. 302 (1957).
C & E News 35: 45, Nov. 11, 1957, page 21.
Lever: The J. of Invt. Derm. 28: 4, April 1957, pp. 317–324.
Markley: Soybeans and Soybean Products, Interscience Pub., vol. 2, N.Y., 1951, pp. 603, 604, 609–13, 628, 629, 656–661, 742.
Shapiro: Amer. J. Physio., vol. 181, May 1955, pp. 141–45.
Snyder: PSEBM 96: 3, December 1957, pp. 670–72.
The Washington Post, Monday, Sept. 16, 1957, page 20.

JULIAN S. LEVITT, *Primary Examiner.*

M. O. WOLK, FRANK CACCIAPAGLIA, JR., LEWIS GOTTS, *Examiners.*